Sept. 14, 1926.
E. W. VOLKMANN
TOOL FOR REPAIRING HORSESHOES
Filed Feb. 20, 1922
1,599,934
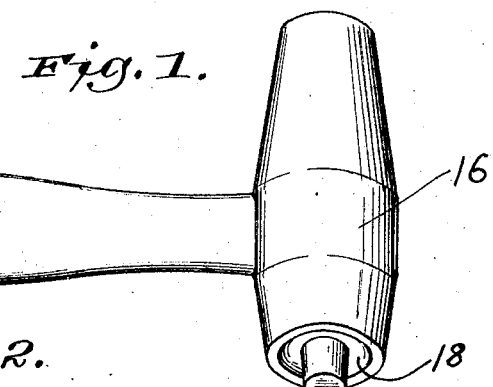
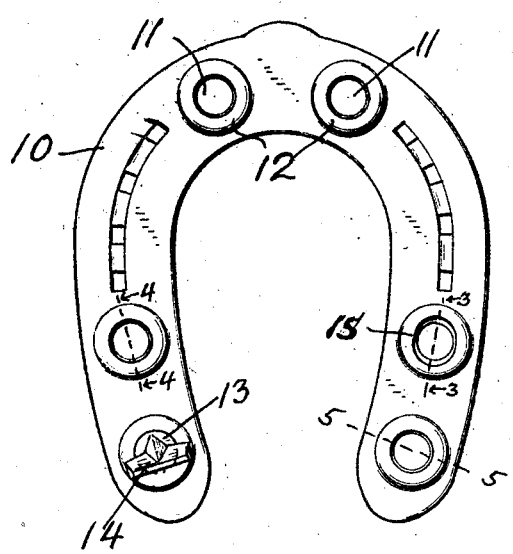
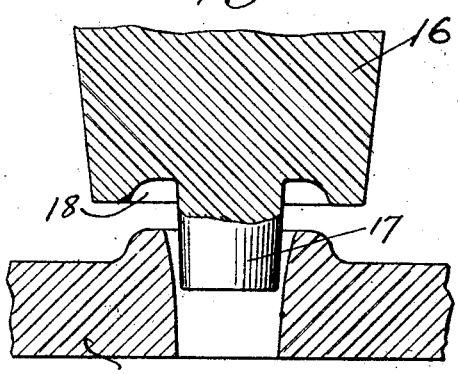
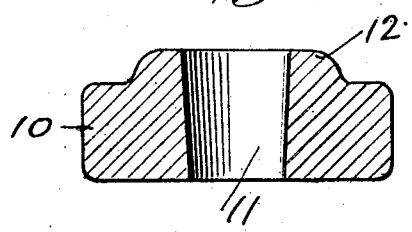
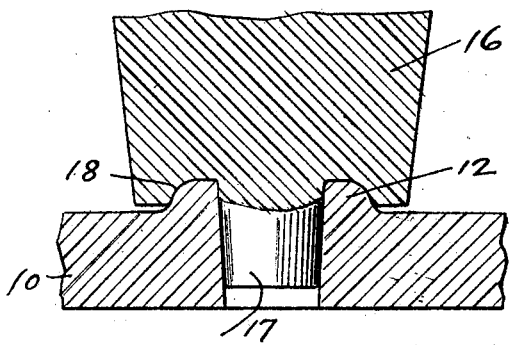
Witness:
Fred Palm
Del.
INVENTOR.
Emil W. Volkmann,
BY
Erwin, Wheeler & Woolard
ATTORNEYS.

Patented Sept. 14, 1926.

1,599,934

UNITED STATES PATENT OFFICE.

EMIL W. VOLKMANN, OF MILWAUKEE, WISCONSIN.

TOOL FOR REPAIRING HORSESHOES.

Application filed February 20, 1922. Serial No. 538,049.

The invention relates to a tool designed to repair and restore to usable condition, horse-shoes in connection with which anti-slipping renewable calks are used.

Horse-shoes of this type are provided with holes in which the shanks of the projecting calks are inserted and held by frictional engagement. In continued use, the holes become elongated in the direction of the draft, by reason of the pressure of the shank of the calk against the surrounding metal in the horse-shoe.

As a result, the calks become loose and fall out of the holes in which they are set, and are lost. This condition is often attended with disastrous results, and it is necessary to discard the worn horse-shoe in cases where the enlarged holes cannot be reduced in diameter so as to hold firmly the shanks of new calks when inserted therein.

In previous attempts to restore the worn horse-shoe to condition, it has been the practice to hammer the face of the horse-shoe so as to close the elongated hole, but the practice is only partially successful, in that the metal is not evenly extended into the hole, which latter must be further shaped to adapt it to receive the shank of the calk. The separate operations of reducing the hole by hammering the face of the horse-shoe, and then enlarging the hole to the diameter of the shank of the calk, are time consuming, and are not productive of entirely satisfactory results.

My improved tool is embodied in a device in which the two operations are combined, so that in a single operation I close the elongated hole and at the same time shape it to the shank of the calk.

The improved tool is provided on one face with a centering device or finder corresponding in diameter with the shank of the calk. The face of the tool is provided with a circumferential recess surrounding the centering device or finder. The finder is inserted in the hole in the horse-shoe, and a blow with a hammer is given the other end of the tool. The blow referred to acts to draw or crowd the metal adjacent the hole toward the finder, it also reducing the diameter of the hole to the exact desired size for the reception of the calk, which latter is held firmly in position as in the case of new horse-shoes.

The novel features of the invention will be pointed out in the appended claims.

In the drawings:

Figure 1 is a perspective view of my improved tool.

Fig. 2 is a plan view of a commercial horse-shoe, provided with holes for inserting removable calks.

Fig. 3 is a vertical section, enlarged, on the line 3—3, Fig. 2, showing in a horse-shoe the elongated hole resulting from the strain upon the calks, and showing the tool in position preparatory to the restoring operation.

Fig. 4 is a like view on the line 4—4, Fig. 2, and showing the operation as having been completed.

Fig. 5 is a vertical section on the line 5—5, Fig. 2, transversely of the hole.

In the drawing, the horse-shoe 10 is of the usual type, manufactured with holes 11 for the reception of calks. The holes 11 are surrounded by bosses 12 on the face of the shoe. The shank 13 of the calk 14 is driven into the hole, and retained by frictional engagement of the surfaces of the parts.

In use, as is well understood, the holes 11 become elongated, as at 15, in the direction of the draft, and this enlargement of the opening loosens the calk and permits it to fall out, often with serious results. When the calks are lost, the bosses 12 become worn by contact with the road surfaces.

My improved tool 16 is provided in its face with a centering finder or pin 17, corresponding in diameter to that of the shank of the calk. On the face of the tool also, and surrounding the part 17, is a circumferential recess 18, designed to engage the boss 12 on the face of the shoe, when a blow is applied to the other end of the tool.

The circumferential recess 18 has an inclined or flaring outer wall, which is adapted to displace the metal forming the boss 12, and crowd the same toward the central point. Such movement of the metal is limited by contact with the pin 17, so that in the operation of closing the enlarged opening, the hole of proper dimensions for retaining the shank of the calk is formed.

In order to resist the expansive force generated in effecting the movement of the metal in the boss 12 toward the longitudinal axis of the tool, the groove 18 should be backed or surrounded by a ring of metal sufficient in body to withstand such force, and thus preserve the tool from damage.

The device embodying my invention is very economical and efficient in operation, and by its use new life may be imparted to horse-shoes heretofore considered unserviceable.

Having thus described my invention, what I claim and desire to secure by Letters Patent of the United States, is:

1. A tool for restoring to serviceable condition the calk retaining holes in horse-shoes, the said tool comprising a tapering pin adapted for insertion in the hole and also a concentric groove with a flat bottom forming an angle with the pin, the groove having a flaring annular wall adapted to crowd the adjacent metal of the horse-shoe into engagement with the said pin, and form a tapering hole surrounded by a plane surface.

2. A tool for repairing worn horse-shoes, the said tool being provided with a tapering pin adapted for insertion in the calk retaining hole of the horse-shoe and also with a circumferential groove and an outer backing ring thereabout on the face of the tool, the said groove having a flat bottom forming an angle with the pin and a flaring outer wall adapted to crowd the metal of the horse-shoe into engagement with the pin to produce a tapering hole surrounded by a plane surface, when pressure is applied to the tool.

In testimony whereof, I have signed my name at Milwaukee, this 15th day of February, 1922.

E. W. VOLKMANN.